United States Patent [19]

Adams

[11] 4,076,034

[45] Feb. 28, 1978

[54] METHOD FOR SEALING A BUTTERFLY VALVE

[75] Inventor: Horst Adams, Bochum, Germany

[73] Assignee: Panamera, A.G., Switzerland

[21] Appl. No.: 726,335

[22] Filed: Sep. 24, 1976

Related U.S. Application Data

[62] Division of Ser. No. 611,764, Sept. 9, 1975, Pat. No. 4,003,394.

[30] Foreign Application Priority Data

Sep. 12, 1974 Germany .............................. 2443723
Jul. 23, 1975 Germany .............................. 2532879

[51] Int. Cl.² ......................... F16K 1/22; F16K 25/00
[52] U.S. Cl. ..................................................... 137/15
[58] Field of Search ..................... 137/1, 15, 237, 238, 137/240, 246, 246.22; 251/305–308

[56] References Cited

U.S. PATENT DOCUMENTS

| | | | |
|---|---|---|---|
| 1,990,309 | 2/1935 | Phillips | 137/246.22 |
| 3,532,321 | 10/1970 | Bowman | 251/306 X |
| 3,620,242 | 11/1971 | Pease | 251/306 X |
| 3,749,115 | 7/1973 | Raftis | 251/306 X |

Primary Examiner—William R. Cline
Assistant Examiner—Richard Gerard
Attorney, Agent, or Firm—Townsend and Townsend

[57] ABSTRACT

A disc valve for placement in a cylindrical housing forming part of a conduit which has a pivotally mounted disc and a valve seat that is angularly inclined relative to a plane perpendicular to an axis through the housing. The disc has a peripheral seal defined by a plurality of seal rings disposed within a peripherally open groove in the disc. The root diameter of the groove is smaller than the inner diameter of the seal rings so that the latter can float relative to the former. A lock ring securely retains the seal rings in place after the seal rings have been centered relative to the valve seat by first closing the disc and thereafter tightening the lock ring. A space between the seal rings includes generally radially oriented openings in fluid communication with a source of a pressurized medium on the exterior of the valve for applying the medium to the space between the seal rings and to thereby clean the valve seat when closing the disc. When the disc is closed the medium forms a pressure barrier between the upstream and the downstream sides of the disc.

3 Claims, 4 Drawing Figures

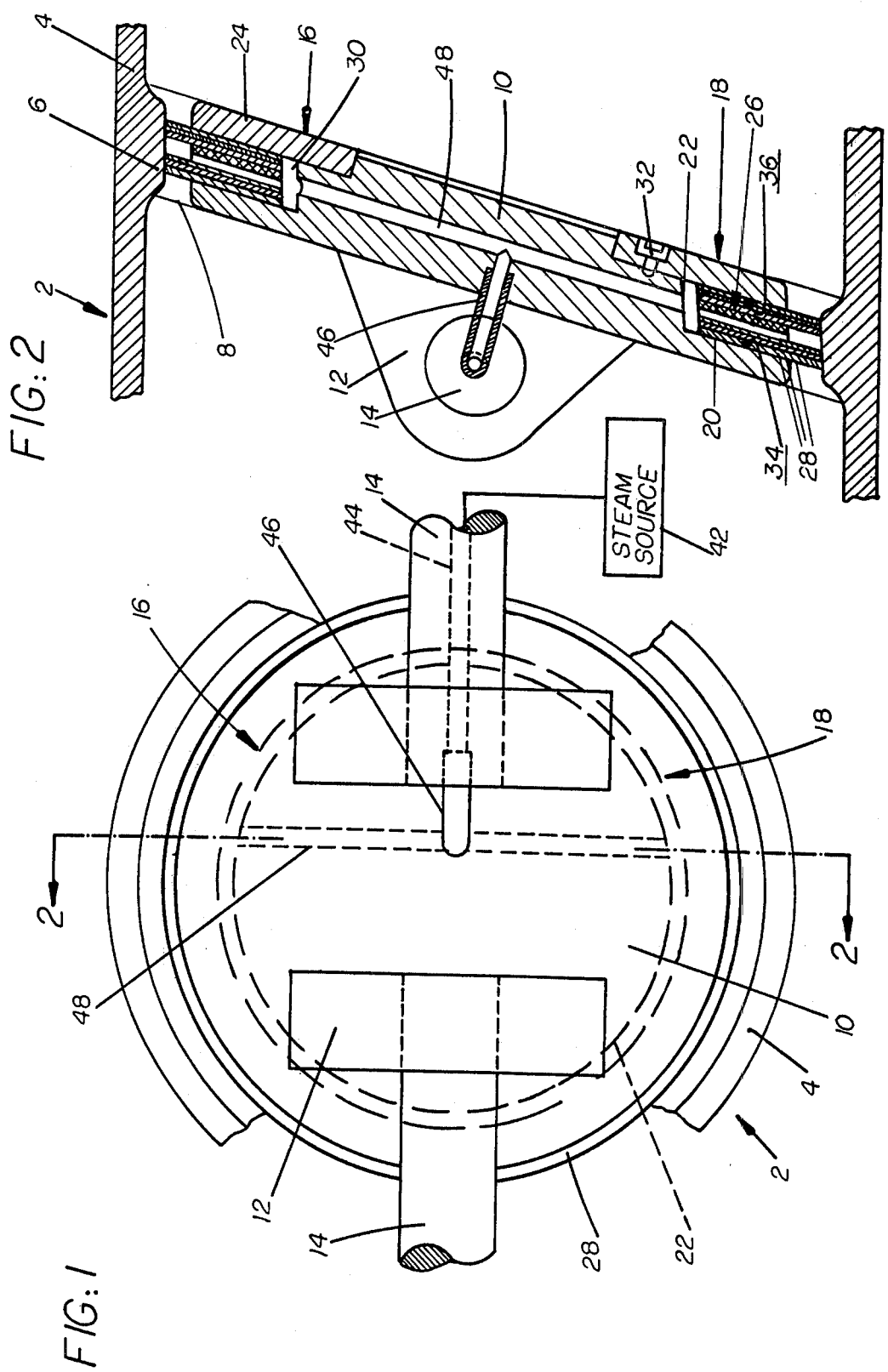

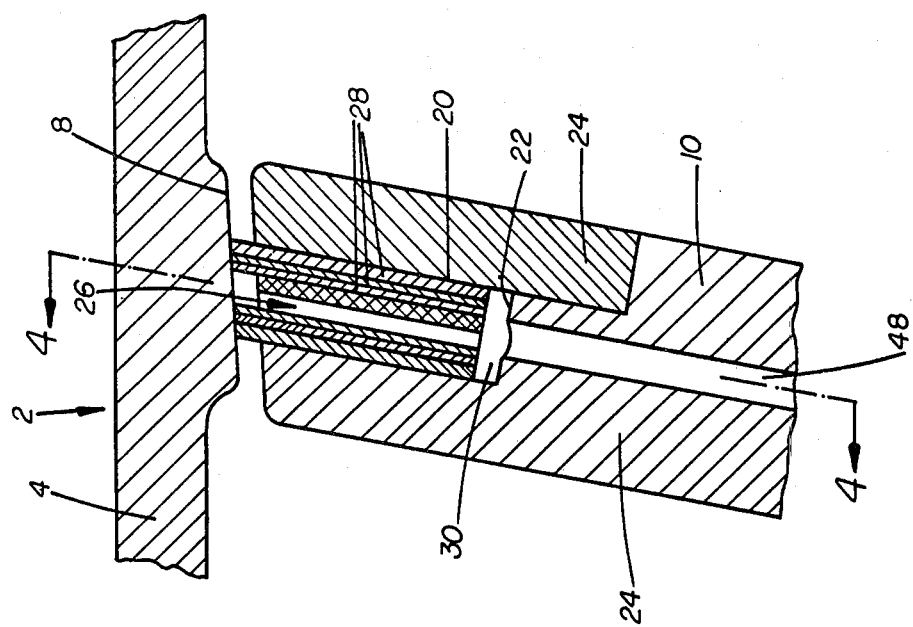
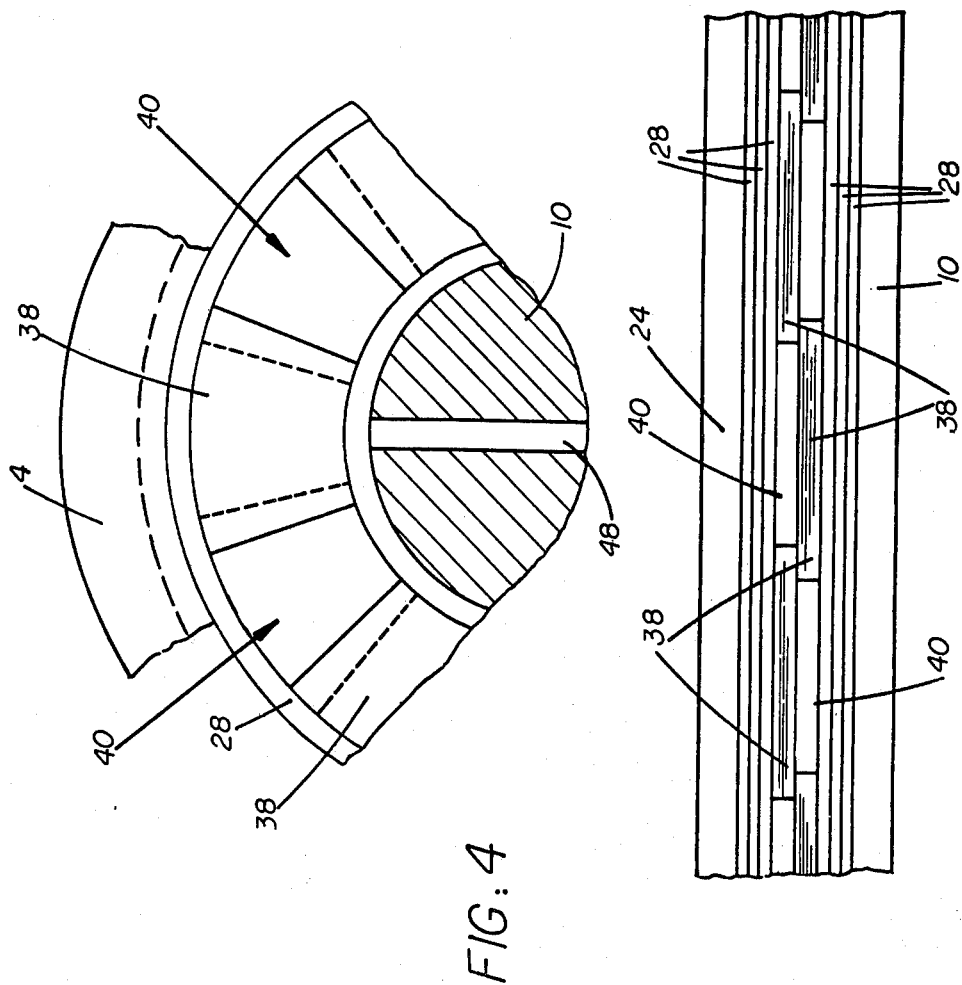

METHOD FOR SEALING A BUTTERFLY VALVE

This is a division of application Ser. No. 611,764, filed 9/9/75, now U.S. Pat. No. 4,003,394.

BACKGROUND OF THE INVENTION

The present invention relates to disc or butterfly type valve in which a disc is pivotally disposed within a generally cylindrical housing for pivotal movements of the disc between an open position, in which the disc is generally parallel to the axis through the housing, and a closed position in which the disc is transverse to the axis of the housing.

A large variety of disc valves are presently in use. One particularly advantageous construction is disclosed and claimed in U.S. Pat. No. 3,442,488, the disclosure of which is incorporated herein by reference. To briefly summarize the operation of the valve disclosed in that U.S. Patent, the disc is rotatable about an eccentric pivot axis to move it into and away from sealing engagement with the internal or sealing surface of an inclined annular valve seat. The sealing surface of the valve seat defines a conical surface whose axis forms an acute angle with the axis of the valve housing. The disc pivot axis is perpendicular to and offset from the housing axis to define a larger and a smaller disc and sealing surface segment. The configuration of the sealing surface and of the disc are such that when the disc is tilted into its closed position its sealing element or seal ring is wedged into sealing engagement with the valve seat. Wear of the sealing surfaces or the seal ring from predominantly sliding engagement is thereby reduced or eliminated. Further details of the construction of such a valve are set forth in the referenced patent.

When the seal ring of the disc is made from an inelastic material, such as metal, it has proven difficult to assure a tight fit between the seal ring and the valve seat over the full circumference of the former. Failure to assure such a tight seat results in valve leakage when the disc is closed. In some applications, particularly when the valves are used in the chemical and petrochemical processing industries an absolute seal is mandatory. Even the slightest leakage across the closed disc cannot be tolerated since the fluid media on the upstream and on the downstream sides of the disc must, in many such applications, be maintained fully separated to prevent explosions.

To assure a complete seal it was heretofore necessary to machine the sealing element, assemble it with the disc and install it in the valve housing with the utmost care. This has proved particularly burdensome and difficult with valves of large diameters, some of them reaching diameters up to three meters. This in turn resulted in substantial cost increases and made such valves relatively expensive to produce.

Furthermore, particularly when the seal ring of the disc is constructed of metal the contact between it and the valve seat could lead to surface damage when foreign objects or particles are present on the seat. Such surface damage, normally scratches or indentations in the valve seat surface, could lead to leakage when the disc is closed.

Once leakage due to valve seat surface damage has occurred it can only be rectified by repairing the valve. Normally this involves the removal of the valve from the line, its transportation to the plant and expensive repair work. While the valve is removed from the pipeline the latter is inoperative unless a replacement valve is available. Thus, valve repair can result in down-times of expensive processing plants and cause heavy losses.

SUMMARY OF THE INVENTION

The present invention substantially facilitates the ease with which disc type valves are made and assembled and it further improves the operating characteristics of such valves by greatly reducing the danger of leakage when the disc is closed. A first aspect of the invention relates to the manufacture and assembly of the seal ring and the disc. The seal ring is annular in shape and its outer periphery seats against the valve seat to establish a seal. For this purpose the disc includes a peripherally open groove defined by an L-shaped recess or undercut and a locking ring placed against one face of the disc to overlie the recess and define one wall of the groove. One or more seal rings are disposed in the groove and have an inner diameter which is larger than the root or base diameter or the groove in the disc so that the steel ring can slide of "float" relative to the disc when the locking ring is loosened. To facilitate such sliding of the disc sides of the groove defined by the disc and by the locking ring have a smooth surface finish, e.g. they are polished to minimize frictional forces between them and the seal ring.

The seal ring only needs to be machined so that its periphery is properly dimensioned to seat against the valve seat. No criticality in manufacturing tolerances is necessary to center the seal ring relative to the disc and the valve seat. When the valve is assembled the locking ring is loosened, as by backing up threaded bolts which secure the locking ring to the disc, so that the seal ring is free to float in the groove. The disc is then closed whereby the seal ring is automatically centered relative to the valve seat because of its engagement therewith. With the valve in the closed position, and the seal ring centered, the threaded bolts are tightened to immovably secure the seal ring to the disc in its centered position.

Tight interrelated manufacturing tolerances on the housing, the valve seat, the disc, the disc mounting, etc. are thereby substantially relaxed, yielding corresponding savings in the manufacture of the component parts. Yet, the seal ring is precisely aligned and centered after the above described assembly has taken place. Leakage due to misalignments of the seal ring, particularly when the ring is constructed of a metal or a similarly rigid material, is thereby eliminated.

Another aspect of the present invention assures a tight valve seal when the disc is closed even after a prolonged service life of the valve. To this end the seal ring comprises a plurality, i.e., at least two seal ring elements or laminates which are spaced apart to define between them a radially oriented, peripherally open passage. Means is provided for establishing a conduit between this passage and a source of a pressurized medium such as steam on the exterior of the valve. Suitable flow control means applies the pressurized medium to the passage when the disc is pivoted into its closed position to thereby blow off any foreign particles that might adhere to the valve seat before the seal ring contacts the seat. Possible surface damage, scratches, etc. caused by hard seal rings engaging such foreign particles is thereby prevented, and the useful life of the valve is substantially prolonged while its high sealing qualities are maintained.

The fluid medium is selected so that it is inert to the material on the upstream and the downstream sides of the closed disc. The pressurized fluid medium acts as an additional barrier between the two sides of the disc and in the event that there exists a leak between the valve seat and the seal ring on the disc the pressurized, inert fluid will stream through that leak to the affected side of the disc while it prevents the material from flowing from one side of disc to the other side thereof. Steam is a particularly widely applicable pressure medium because it is inert to many substances, particularly those found in the petrochemical processing industry.

BRIEF DESCRIPTION OF THE DRAWINGS

FIG. 1 is a plan view of a disc valve constructed in accordance with the present invention, with parts of the valve housing broken away and with the valve disc shown in its closed position;

FIG. 2 is a side elevational view, in section, and is taken on line 2—2 of FIG. 1;

FIG. 3 is a fragmentary, enlarged side elevational view similar to FIG. 2 and shows constructional details of a disc sealing element constructed in accordance with the present invention;

FIG. 4 is a fragmentary side elevational view taken on line 4—4 of FIG. 3; and

FIG. 5 is a fragmentary plan view of a valve disc constructed in accordance with the present invention.

DESCRIPTION OF THE PREFERRED EMBODIMENTS

Referring to the drawings, a valve 2 generally comprises a cylindrical housing 4 which includes a valve seat 6 having the above discussed conical seating surface 8 and a valve disc 10 that is pivotally mounted to the housing. The valve seat is angularly inclined relative to a plane that is perpendicular relative to the axis through the housing as is best seen in FIG. 2. The disc includes a pair of spaced apart mounting flanges 12 to which axially aligned disc pivot shafts 14 are secured. The pivot shafts are eccentric, that is they are offset relative to the axis through the housing to define a larger and a smaller disc segment 16, 18, respectively. The pivot shafts extend through the valve housing to the exterior thereof for connection to a valve actuator. The mounting of the disc as well as the actuator do not form part of this invention and are therefore not further described herein.

The valve disc includes an annular recess 20 which extends from the periphery of the disc towards the center thereof and which terminates in a cylindrical base or root 22. An annular locking ring 24 is secured e.g. bolted to the disc and overlies the recess to define a peripherally open groove 26. A plurality of seal rings 28 are disposed in groove 26. Each seal ring has an inner diameter which is larger than the diameter of root 22 to define a space 30 so that the seal rings can "float" in groove 26, that is so that the seal rings can move relative to the groove and the center of the disc for purposes described hereinafter. The seal rings have an outer diameter that is larger than the periphery of disc 10 by an amount greater than the difference between the root diameter and the inner diameter of the seal rings so that the full periphery of the seal ring projects past the disc at all times.

For practical purposes the outer diameter of the seal rings is at least 1 mm and at most about 10 mm larger than the periphery of the disc to avoid ring damage due to large pressure differentials between the two sides of the disc. The exact diameter of the seal rings is, of course, largely determined by the size of the valve, its operating pressure, the material of which the seal rings are constructed, etc.

The seal rings further have a combined thickness slightly larger than the width of groove 26 so that when threaded bolts 32 are tightened the seal rings are firmly clamped to the groove and immovable relative thereto.

To assemble valve 2, seal rings 28 are placed in groove 26 and locking ring 24 is loosely secured to the disc so as to permit the seal rings to float in the groove. To facilitate such floating movement opposing walls 34, 36 of the disc and the locking ring defining groove 26 have a smooth surface finish, e.g. they are polished. Next the disc is installed in housing 4 and with the locking ring loosened it is pivoted into its closed position, so that the periphery of the seal rings rests against conical seating surface 8 and a seal is established between the two sides of the closed disc. When the disc is in this position the seal rings are automatically centered relative to the seating surface; they are pushed or they float into the properly aligned and centered position. With the valve disc in the closed position, bolts 32 are tightened to press locking ring 24 against the seal rings and to firmly retain the latter in their centered position. In this manner the seal rings are aligned and centered without requiring tight manufacturing tolerances on the conical seating surface, the valve disc and groove, the pivot shafts and the valve housing mounting for the shafts.

The seal rings 28 are separated into two spaced apart groups, one group being proximate locking ring 24 and the other group being proximate the portion of the disc defining recess 20. Alternating and overlapping spacers 38 each of which has a thickness equal to one-half of the spacing between the seal ring groups are disposed between the groups and they define a plurality of radially oriented, peripherally open passage ways 40 which terminate adjacent the periphery of the seal rings. The spacers may be loose, they may be secured, e.g. bonded, brazed, etc. together, or they may be integrally constructed as by casting them. Their inner diameter equals the inner diameter of seal rings 28 and their outer diameter is less than the outer diameter of the seal rings so as to not interfere with the proper operation of the seal rings.

A pressurized medium such as steam from a steam source 42 positioned exteriorly of valve housing 6 communicates with passage-ways 40 via a coaxial bore 44 through one of the pivot shafts 14, an L-shaped conduit 46 and a bore 48 in disc 10 which communicates with the L-shaped conduit and which terminates at the root surface 22 of groove 26. Consequently, steam from source 42 can be applied to the passage-ways between the seal rings for discharge at the periphery of seal rings.

In operation, steam is applied to passage-ways 40 when the disc is pivoted into its closed position so that pressurized steam is discharged from between the seal rings before the latter contact seating surface 8 of valve seat 6. The pressurized steam blows off any foreign particles that may have lodged on the seating surface so that the metallic seal rings will not engage the foreign particles and scratch either the seal rings and/or the seating surface. Pressurized steam is preferably continuously applied while the disc is in its closed position to form a barrier between the two sides of the valve. In the event a leak should occur in one of the seal rings and the seating surface steam flows through the leak to one or both sides of the housing separated by the closed disc.

This prevents a flow and possible intermixing of the media on the sides of the closed disc, and as above mentioned, possible hazardous accidents. To assure the formation of this secondary steam seal source 42 is selected so that it applies a pressure which exceeds the highest pressure in the valve housing.

From the foregoing description it is apparent that the present invention greatly facilitates the formation of a seal in disc or butterfly type valves. This is accomplished first by assuring a precise alignment and concentricity between the seating surface 8 of the valve housing and the periphery of the seal rings (while actually reducing manufacturing costs because of the much less critical tolerances to which the component parts must be machined); secondly, by removing foreign particles from the seating surface before the seal rings engage that surface; and thirdly by maintaining a pressure block between the fluid media on both sides of the closed disc which is selected so that fluid cannot flow from one side of the closed disc to the other side due to possible seal ring leakage. It will be apparent that the present invention, though particularly applicable to valves employing metallic seal rings is equally applicable to valves which employ seal rings constructed of other material, say plastic, even though the latter might not have to be centered with as much criticality as the former. In addition, it is apparent that steam, though a preferred pressure fluid for application between the seal rings, can be replaced with other media which are inert to the materials which flow through the valve housing.

I claim:

1. A method for sealing a high pressure butterfly valve, the valve having a tubular housing including a valve seat, a disc pivotally mounted within the housing for movement between an open position in which the disc is substantially parallel to an axis through the housing and a closed position in which it is parallel to the valve seat, the disc including a peripheral seal ring disposed in a peripheral seal ring groove of the disc for engaging the valve seat when the disc is closed and a conduit communicating a source of a pressurized fluid with the ring groove, the method comprising the steps of moving the disc from its open position towards its closed position; flowing a pressurized fluid from the source through the conduit into the seal ring groove; flowing the pressurized fluid from the seal ring groove to a periphery of the seal ring by directing the fluid in a generally radial direction along a portion of the seal ring disposed between axial ends of the seal ring while continuing the step of moving the disc, whereby pressurized fluid contacts the seat before the seat is contacted by the seal ring to thereby remove foreign particles from the seat, and continuing the step of moving the disc until the seal ring fully engages the seat and seals an upstream portion of the valve from a downstream portion thereof.

2. A method for sealing a relatively high pressure butterfly valve, the valve having a tubular housing including a valve seat, a disc pivotally mounted within the housing for movement between an open position in which the disc is substantially parallel to an axis through the housing and a closed position in which it is parallel to the valve seat, the disc including a peripheral seal ring disposed in a peripheral seal ring groove of the disc for engaging the valve seat when the disc is closed and a conduit communicating a source of a pressurized fluid with the seal ring groove, the method comprising the steps of: moving the disc from its open position towards its closed position; flowing a pressurized fluid from the source through the conduit into the seal ring groove; flowing the fluid in a plurality of circumferentially spaced, radially oriented independent, fluid flows extending from the groove to an outer periphery of the seal ring and further alternatingly axially offsetting adjacent fluid flows while confining them within the axial extent of the seal ring, and supporting the seal ring over substantially its full radial length to prevent substantial deflections thereof when subjected to differential pressures acting against sides thereof.

3. A method for sealing a relatively high pressure butterfly valve, the valve having a tubular housing including a valve seat, a disc pivotally mounted within the housing for movement between an open position in which the disc is substantially parallel to an axis through the housing and a closed position in which it is parallel to the valve seat, the disc including a peripheral seal ring disposed in a peripheral seal ring groove of the disc for engaging the valve seat when the disc is closed and a conduit communicating a source of a pressurized fluid with the seal ring groove, the method comprising the steps of: moving the disc from its open position towards its closed position; directing a pressurized fluid from the source through the conduit into the seal ring groove; flowing the fluid in a plurality of circumferentially spaced, radially oriented independent, fluid flows extending from the groove to an outer periphery of the seal ring and further alternatingly axially offsetting adjacent fluid flows and confining them within the axial extend of the seal ring while continuing the step of moving the disc, whereby pressurized fluid contacts the seat before the seat is contacted by the seal ring to thereby remove foreign particles from the seat, supporting the seal ring over substantially its full radial length to prevent substantial deflections thereof when subjected to differential pressures acting against sides thereof, and continuing the step of moving the disc until the seal ring fully engages the seat and seals an upstream portion of the valve from a downstream portion thereof.

* * * * *